United States Patent [19]
Goodwin, III

[11] Patent Number: 5,839,116
[45] Date of Patent: Nov. 17, 1998

[54] SYSTEM AND METHOD OF OBTAINING INFORMATION FROM A PRICE LOOK-UP FILE

[75] Inventor: John C. Goodwin, III, Suwanee, Ga.

[73] Assignee: NCR Corporation, Dayton, Ohio

[21] Appl. No.: 539,449

[22] Filed: Oct. 5, 1995

[51] Int. Cl.⁶ .................................................. G06F 151/00
[52] U.S. Cl. ............................................. 705/20; 395/220
[58] Field of Search ...................................... 364/405, 401, 364/478.13; 235/383; 177/25.15; 371/5.1; 375/219; 705/20; 395/220

[56] References Cited

U.S. PATENT DOCUMENTS

| | | | |
|---|---|---|---|
| 4,855,908 | 8/1989 | Shimoda et al. | 364/405 |
| 4,859,838 | 8/1989 | Okiharu | 235/383 |
| 4,932,485 | 6/1990 | Mori | 177/25.15 |
| 5,200,889 | 4/1993 | Mori | 364/401 |
| 5,619,416 | 4/1997 | Kosarew | 364/478.13 |
| 5,663,963 | 9/1997 | Goodwin, III | 371/5.1 |
| 5,694,418 | 12/1997 | Goodwin, III | 375/219 |

Primary Examiner—Kevin J. Teska
Assistant Examiner—Russell W. Frejd
Attorney, Agent, or Firm—Paul W. Martin; Peter H. Priest

[57] ABSTRACT

A system and method of obtaining information from a price look-up (PLU) file which employ an application programming interface which isolates application programs from each other. The system preferably includes a storage medium containing the PLU file, a computer coupled to the storage medium, control software executed by the computer, an application programming interface (API) having hooks into the control software, and a program executed by the computer which attaches into the API via interprocess communications for obtaining information for an item from the PLU file.

10 Claims, 4 Drawing Sheets

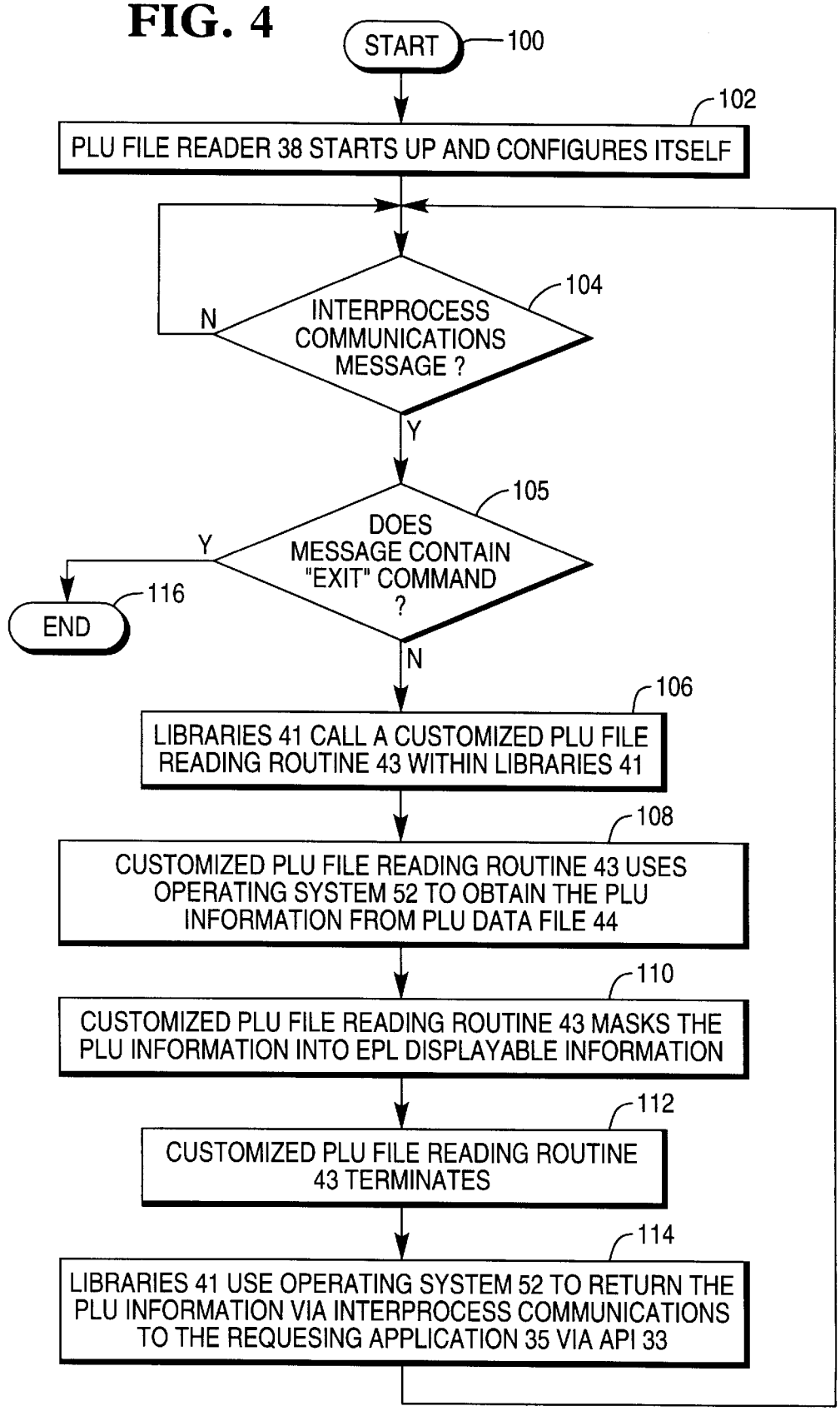

SYSTEM AND METHOD OF OBTAINING INFORMATION FROM A PRICE LOOK-UP FILE

BACKGROUND OF THE INVENTION

The present invention relates to electronic price label (EPL) systems, and more specifically to a system and method of obtaining information from a price look-up (PLU) file.

In a traditional retail store, bar code scanners rely on price information maintained within a PLU file. The PLU file is typically stored in a single location at host server.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. The EPL data file contains EPL identification information, and EPL merchandise item information.

Price mismatch can occur in EPL systems that obtain price information from a duplicate PLU file. Therefore, it would be desirable to provide a PLU file reader for use by the EPL system to eliminate the need for a duplicate PLU file. It would also be desirable for the PLU file reader to be a generic application, capable of being compiled to suit any given operating system and/or point-of-sale (POS) system that allows direct access to the PLU file or has a standard application programming interface (API) and/or service layer for accessing the PLU file.

SUMMARY OF THE INVENTION

In accordance with the teachings of the present invention, a system and method of obtaining information from a PLU file are provided.

The system preferably includes a storage medium containing the PLU file, a computer coupled to the storage medium, control software executed by the computer, an API having hooks into the control software, and a program executed by the computer which attaches into the API via interprocess communications for obtaining information for an item from the PLU file.

The control software may be an operating system or a transaction management program.

When the PLU information is price information, the system further includes an electronic price label with a display for displaying the price information.

It is a feature of the present invention that the API isolates applications from each other, allowing the program that obtains the PLU information to be modified to suit the individual needs of a transaction establishment and without requiring that the other applications be modified.

A method of obtaining information for an application program from a price look-up (PLU) file includes the steps of providing a PLU file reading program, providing an application programming interface (API) between the application program and the PLU file reading program, sending a call for the information to the API by the application program, sending a request message for the information to the PLU file reading program by the API, instructing control software to obtain the information from the PLU file by the PLU file reading program, sending the PLU information to the API by the PLU file reading program, sending the PLU information to the application program by the API.

It is accordingly an object of the present invention to provide a system and method of obtaining information from a PLU file.

It is another object of the present invention to provide a system and method of obtaining information from a PLU file, including a PLU file reader program which is capable of being compiled to run on any given operating system and/or point-of-sale (POS) system that allows direct access to the PLU file or has a standard API and/or service layer for accessing the PLU file.

It is another object of the present invention to provide a system and method of obtaining information from a PLU file, which employ an API to isolate application programs from each other so that applications may be modified without requiring modification of other applications.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a flow diagram illustrating the operation of the PLU file reader program.

DETAILED DESCRIPTION OF THE PREFERRED EMBODIMENT

Figure 1:
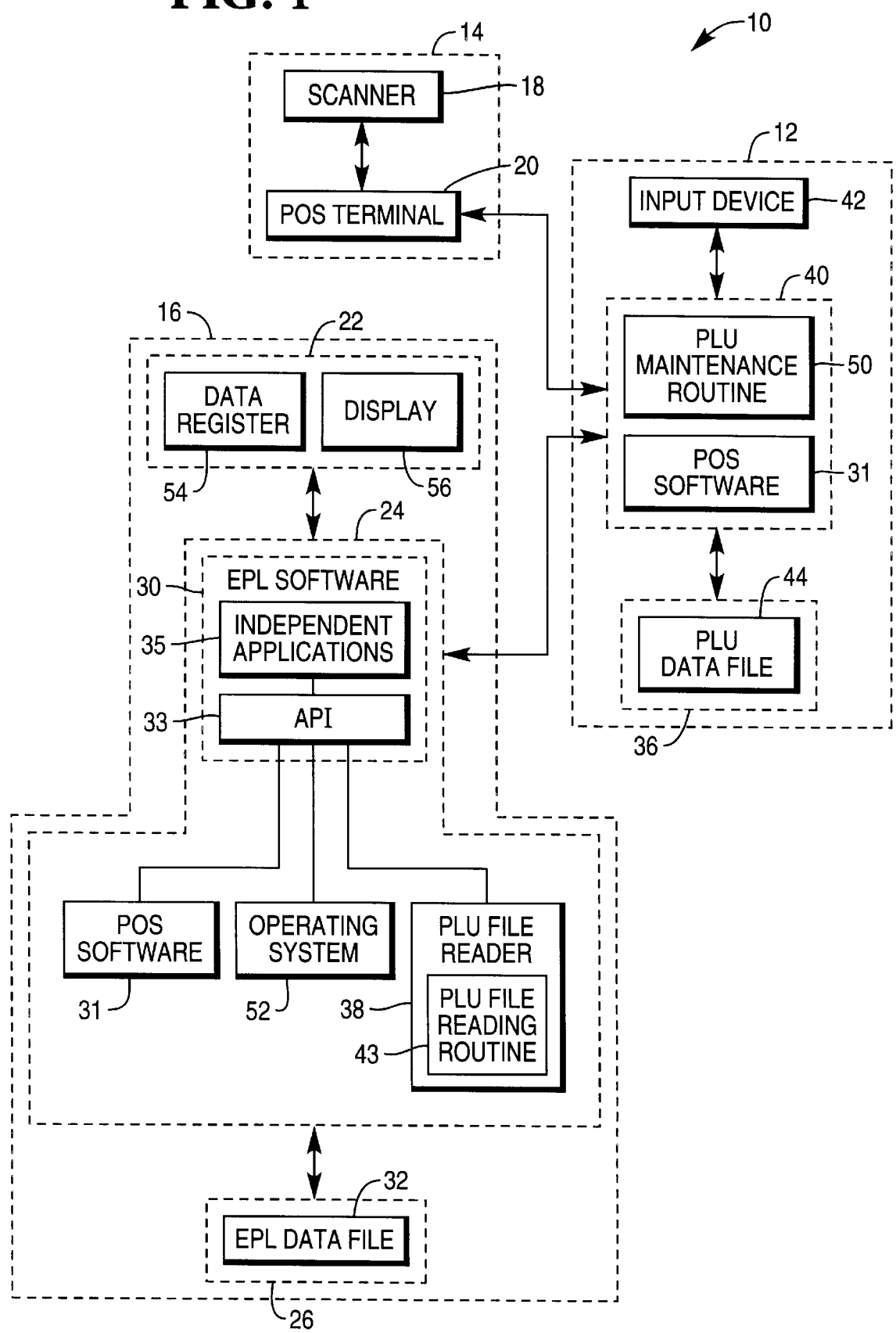
FIG. 1 is a block diagram of a transaction management system.

Referring now to FIG. 1, transaction system 10 preferably includes host computer system 12, point-of-service (POS) system 14, and EPL system 16.

POS system 14 preferably includes bar code scanner 18 and terminal 20.

EPL system 16 preferably includes EPLs 22, host EPL terminal 24, and EPL storage medium 26.

EPLs 22 are typically attached to shelves within a store and include a data register 54 and a display 56. Data registers 54 contain data, usually the price of an item associated with an EPL on the shelves. The data is typically displayed by display 56.

Host EPL terminal 24 executes EPL software 30, which maintains the contents of EPL data file 32. EPL software 30 includes application programming interface (API) 33, which has hooks to operating system 52 or POS software 31. For example, a commercially-available API exists for the UNIX and OS/2 operating systems of Novell and IBM, and the UNITY POS software of AT&T Global Information Solutions Company. EPL software 30 includes a suit of independent applications 35 which all have hooks to API 33.

Host EPL terminal 24 also executes PLU file reader 38, which is compiled to run on operating system 52 or on POS software 31, depending on the needs of the transaction establishment. PLU file reader 38 directly accesses PLU information in PLU data file 44, as an alternative to maintaining a duplicate of PLU data file 44. The PLU information is preferably price information.

PLU file reader 38 is linked to API 33 through interprocess communications and includes PLU file reading routine 43 which works with API 33 to cause POS software 31 or operating system 52 to read PLU data file 44 and transfer PLU information to electronic price label (EPL) software 30. Eliminating the need for a duplicated file also eliminates the possibility of price mismatch occurring between PLU data file 44 and the duplicate file.

Advantageously, none of the other applications 35 have to change if PLU reader 38 is created and placed into system 10. As PLU reader 38 attaches into API 33 via interprocess communications, it isolates independent application programs 35 from the details of PLU maintenance routine 50 and PLU data file 44. PLU reader 38 masks price information in PLU data file 44 into displayable formats for EPL system 16. In many EPL systems, data format 9/9.99 (9 for 9.99) or 99.99is the maximum price display. As further examples, data format 2/12.40 masks into displayable information 6.20 and data format 10/1.10 masks into displayable information 0.11.

This method proves advantageous in handling advanced pricing methods. For example, one customer may wish to display price information for a "buy one get one free" item differently than price information for another item. PLU reader 38 performs this change a single time and independent applications do not require modification because of this change.

EPL storage medium 26 stores EPL data file 32 and is preferably a fixed disk drive.

Host computer system 12 includes PLU storage medium 36, host PLU terminal 40, and input device 42.

PLU storage medium 36 stores PLU data file 44. PLU file 44 is preferably the sole location for storing item prices and is available for distribution to POS terminal 20 by host PLU terminal 40. Alternatively, provision may be made for bar code scanner 18 to directly access primary PLU file 44 from host PLU terminal 40.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals.

Host PLU terminal 40 executes POS software 31 and PLU maintenance routine 50. PLU maintenance routine 50 is controlled by POS software 31 and updates PLU file 44, prepares system 12 for a loss of PLU data file 44, and executes PLU data recovery procedures.

Input device 42 is preferably a keyboard.

PLU maintenance routine 50 may send changes in price in PLU file 44 directly to EPL terminal 24 and POS terminal 20 as they are entered in input device 42 (immediate processing) or store price changes within a batch file for later batch updating (batch processing).

During normal operation, EPL terminal 24 executes PLU file reader 38 to obtain price information from PLU data file 44. EPL software 30 sends the price information to data register 54. Display 56 displays the price in data register 54.

Figure 2:
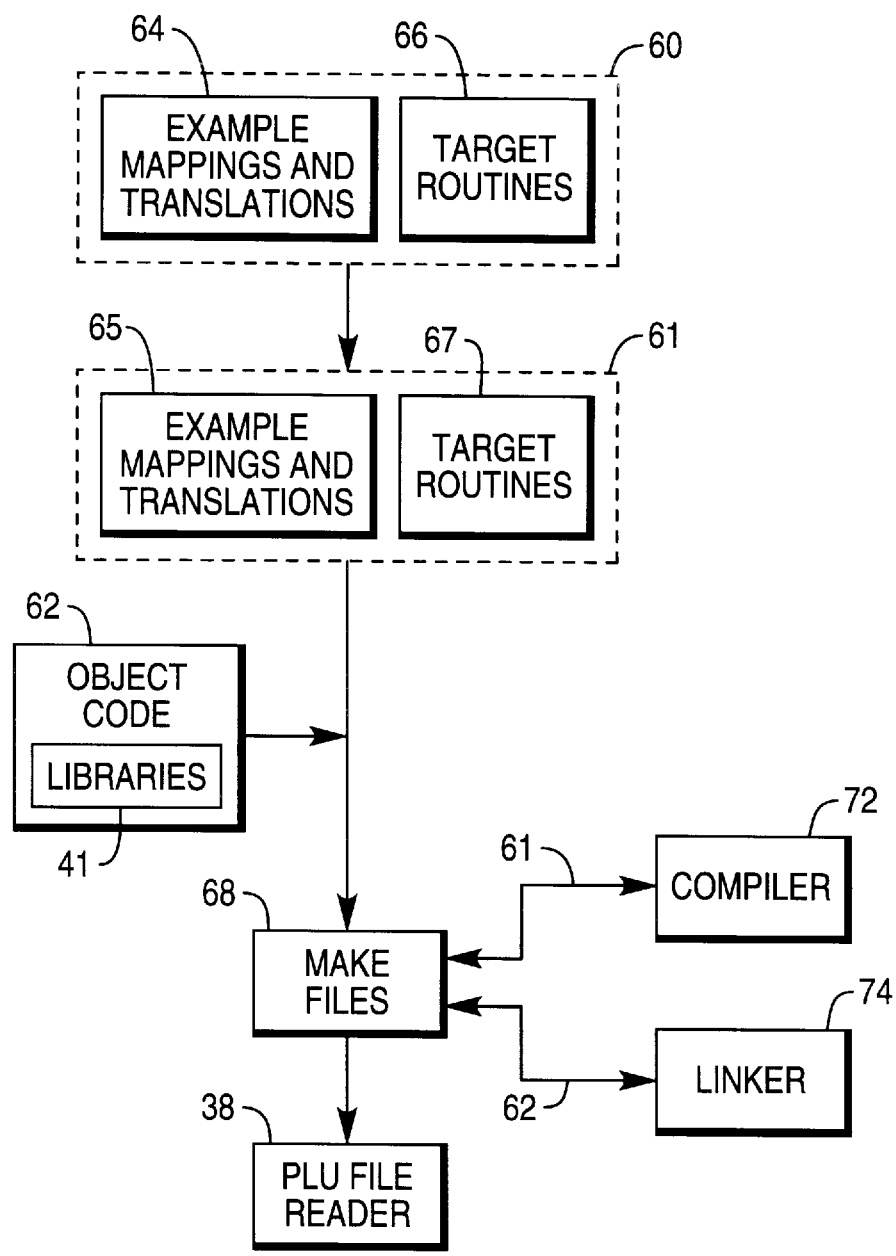
FIG. 2 is a block diagram of a system for producing a PLU file reader program.

Turning now to FIG. 2, the components that are used to construct PLU file reader 38 include template PLU file reader 60, object code 62, example mappings and translations 64, target routines 66, and make files 68. Template PLU reader 60 is a super set of example mappings and translations 64 and target routines 66. Example mappings and translations 64 and target routines 66 are edited and customized by developers to produce customized mappings and translations 65 and customized target routines 67 (customized template PLU 61). PLU file reading routine 43 is an example of a customized target routine. Customized mappings and translations 65 and customized target routines 67 along with object code 62 are fed into make files 68 in order to produce executable code for a PLU file reader 38.

Object code 62 consists of libraries 41 that provide an interface into API 33 and isolate all other EPL applications from API 33, thus allowing the existence of PLU file reader 38. Included in libraries 41 are functions to perform module start up, open PLU data file 44, connect an application to PLU data file 44, close an application's connection to PLU data file 44, close PLU data file 44, and to terminate the application.

Example mappings and translations 64 provide non-displayable information (in code and/or in documentation) and may be edited to customize PLU file reader 38.

Target routines 66 are routines that may be edited and customized to suit the needs of the target transaction establishment.

Make files 68 are files that pass source code (template 60) through compiler 72 and then pass object code 62 through linker 74 to produce the target executable.

Figure 3:
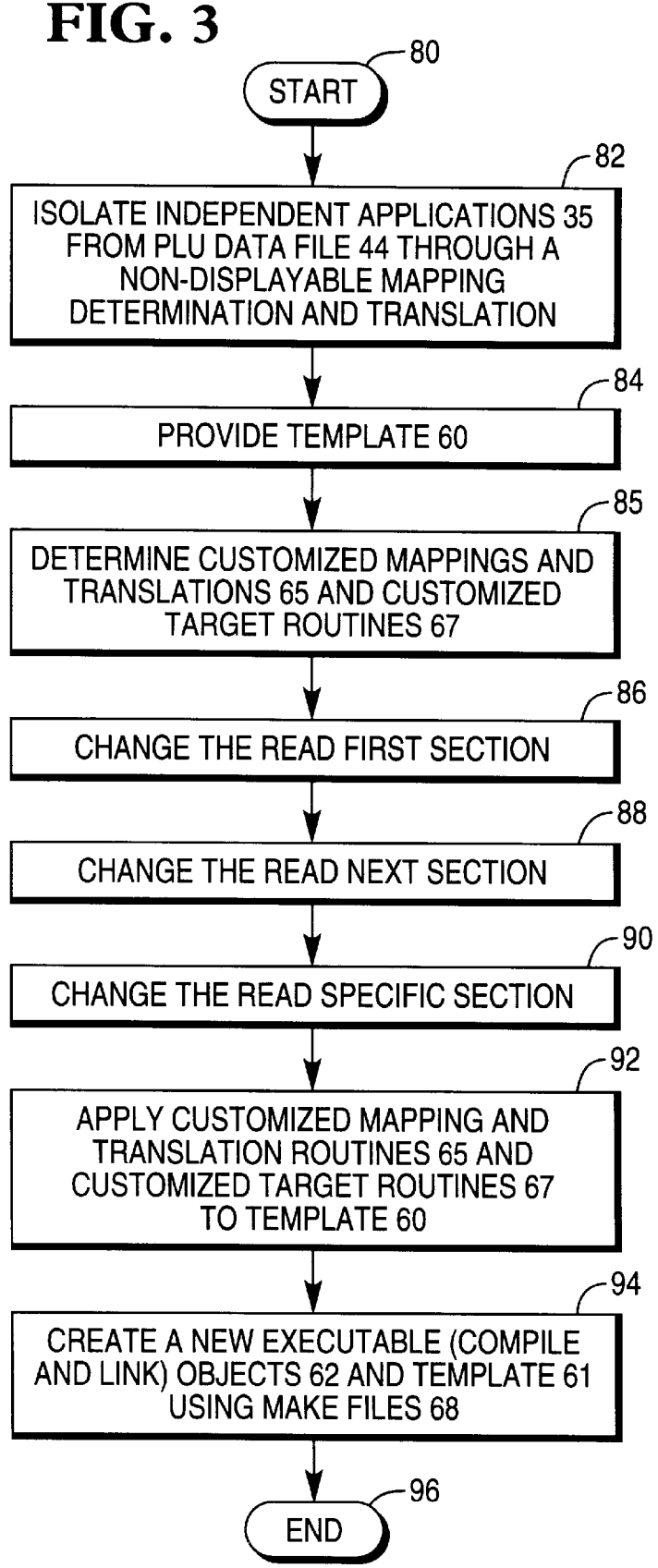
FIG. 3 is a flow diagram illustrating how the PLU file reader is created.

Turning now to FIG. 3, the method of creating generic PLU file reader 38 begins with START 80.

In step 82, independent applications 35 are isolated from PLU data file 44 through a non-displayable mapping determination and translation process. Example mappings and translations 64 result. This original development effort is provided to customers for future customization.

In steps 84, template 60 is provided. Template 60 is packaged in an installable format that can then be distributed and installed on the target system.

In step 85, customized mappings and translations 65 and customized target routines 67 are determined so that all information for an EPL can be displayed. Connection methods that will be employed for the target system are also determined.

In steps 86–92, customized template 61 is produced by changing template 60 to reflect customized mappings and translations 65. This work is performed by developers who are responsible for the integration of EPL system 16 for a target customer. Integration and customization are directed by the customer. This gives the customer the opportunity to gain a competitive advantage by displaying the information required to better serve its customers.

In step 86, the "read first" section is changed. The "read first" section is a routine that must be completed/customized to read the first PLU in PLU data file 44.

In step 88, the "read next" section is changed. The "read next" section is a routine that must be completed/customized to read the next PLU in PLU data file 44 sequentially.

In step 90, the "read specific" section is changed. The "read specific" section is a routine that must be completed/customized to read a specific PLU data file record.

In step 92, customized mapping and translations 65 and customized target routines 67 derived from step 85 are applied to template 60.

In step 94, a new executable (PLU file reader 38) is compiled and linked from object code 62 and template 61 using make files 68, compiler 72, and linker 74.

In step 96, the method ends.

Referring now to FIG. 4, the operation of PLU file reader 38 is illustrated in detail, beginning with START 100.

In step 102, PLU file reader 38 starts up and configures itself.

In step 104, PLU file reader 38 waits for an interprocess communications message from API 33. Interprocess communication services (e.g., "queues" for UNIX, threads or pipes for OS/2) are provided by operating system 52. API 33 calls on operating system 52 to send a request from one of independent applications 35 to PLU file reader 38. For example, this independent application 35 may be a price verifier application program that compares a price PLU data file 44 with a price displayed by EPL 22. Independent application program 35 issues a call to API 33, instructing API 33 to perform a "read direct" routine provided by API 33. API 33 calls on operating system 52 to send the interprocess communications message to PLU file reader 38. Preferably, API 33 passes the message to libraries 41 within PLU file reader 38.

If such a message is received, PLU file reader 38 determines whether the interprocess communications message contains an "exit" command in step 105. If it does, PLU file reader 38 terminates in step 116.

If the interprocess communications message does not contain an "exit" command, libraries 41 call a PLU file reading routine 43 within libraries 41 in step 106. PLU file reading routine 43 is customized to the needs of the transaction establishment.

In step 108, PLU file reading routine 43 uses operating system 52 to obtain the PLU information from PLU data file 44.

In step 110, PLU file reading routine 43 masks the PLU information from PLU data file 44. For example, if application program 35 is a program which controls price information displayed by EPL 22, masking would include converting the PLU information into information that is displayable by EPL 22.

In step 112, PLU file reading routine 43 terminates.

In step 114, libraries 41 call on operating system 52 to return the PLU information via interprocess communications to the requesting application 35 via API 33. PLU file reader 38 returns to a waiting state in step 104.

After PLU file reader 38 sends the PLU information to API 33, API 33 passes the PLU information to the requesting application 35. Application program 35 can then display the information, compare the information, or otherwise examine the information in accordance with the function of application program 35.

Although the present invention has been described with particular reference to certain preferred embodiments thereof, variations and modifications of the present invention can be effected within the spirit and scope of the following claims.

What is claimed is:

1. A host electronic price label (EPL) terminal for use in an EPL system, comprising:

control software;

EPL software, the control software and the EPL software each having hooks into an application programming interface (API); and a price look-up (PLU) file reader attached into the API via interprocess communications for directly accessing information from a PLU file stored on a host computer, such that the modification of one of the programs which attach into the API does not require modification of other programs which attach into the API.

2. A host EPL terminal according to claim 1, wherein the control software comprises an operating system.

3. A host EPL terminal according to claim 1, wherein the control software comprises transaction management software.

4. A host EPL terminal according to claim 1, wherein the PLU file reader comprises:

a template PLU reader, including example mappings and translations and target routines that are fed into make files in order to produce executable code for a PLU file reader, and object code, comprising libraries that provide an interface into the API and isolate all other EPL applications from the API, thereby allowing the existence of the PLU file reader.

5. A host EPL terminal according to claim 4, wherein the template reader comprises a superset of example mappings and translations and target routines.

6. A host EPL terminal according to claim 5, wherein the example mappings and translations are edited and customized to produce customized mappings and translations and customized target routines.

7. A host EPL terminal according to claim 6, wherein the customized mappings and translations and customized target routines are fed into make files in order to produce executable code for the PLU file reader.

8. A host EPL terminal according to claim 4, wherein the object code libraries include functions to perform module start up, open a PLU data file, connect an application to the PLU data file, close an application's connection to the PLU data file, close the PLU data file, and terminate the application.

9. A method for creating a PLU file reader in an EPL system, the method comprising the following steps:

isolating independent applications from a PLU data file through a non-displayable mapping determination and translation process, resulting in example mappings and translations;

providing a template, packaged in an installable format that can be distributed and installed on the EPL system;

determining customized mappings and translations and customized target routines so that all information for an EPL can be displayed;

determining connection methods that will be employed for the target system;

producing a customized template by changing the template to reflect customized mappings and translations;

changing a read first routine that must be completed and customized to read the first PLU in the PLU data file;

changing a read next routine that must be completed and customized to read the next PLU in the PLU data file sequentially;

changing a read specific routine that must be completed and customized to read a specific PLU data file record;

applying customized mapping and translations and customized target routines to the template; and using make files, a compiler, and a linker to compile and link an executable PLU file reader from object code and the customized template.

10. A method for reading a PLU file in an EPL system, the method comprising the following steps:

providing a PLU file reader having libraries of functions;

providing an application programming interface (API) between the PLU file reader and an independent EPL application;

sending a call from an independent application to the API requesting PLU information;

sending a call from the API to control software to send an interprocess communications message to the PLU file reader;

using the control software to obtain the requested PLU information from a PLU data file;

using a function in the PLU file reader libraries to convert the obtained PLU information into information that is displayable by an EPL;

sending a call from the PLU file reader libraries to the control software to return the PLU information via interprocess communications to the requesting independent EPL application via the API.

* * * * *